United States Patent [19]

Geary

[11] 4,254,630

[45] Mar. 10, 1981

[54] HEAT RECLAIMING METHOD AND APPARATUS

[75] Inventor: David F. Geary, Fayetteville, N.Y.

[73] Assignee: Carrier Corporation, Syracuse, N.Y.

[21] Appl. No.: 44,823

[22] Filed: Jun. 1, 1979

[51] Int. Cl.³ ........................... F25B 7/00; F25B 27/02
[52] U.S. Cl. ........................................ 62/79; 62/238.6
[58] Field of Search ..................... 62/238 E, 79, 324 D

[56] References Cited

U.S. PATENT DOCUMENTS

| | | | |
|---|---|---|---|
| 3,188,829 | 6/1965 | Siewert et al. | 62/238 E |
| 3,513,663 | 5/1970 | Martin, Jr. et al. | 62/238 E |
| 3,523,575 | 8/1970 | Olivieri | 62/238 E |
| 3,922,876 | 12/1975 | Wetherington, Jr. et al. | 62/238 E |
| 4,091,636 | 5/1978 | Margen | 62/238 E |
| 4,142,379 | 3/1979 | Kuklinski | 62/238 E |

FOREIGN PATENT DOCUMENTS 2378242  9/1978  France .................................. 62/238 E

*Primary Examiner*—Lloyd L. King

*Attorney, Agent, or Firm*—J. Raymond Curtin; John S. Sensny

[57] ABSTRACT

Heat reclaiming method and apparatus for use with a vapor compression refrigeration circuit, a heat transfer fluid, and a heat storage facility. The heat reclaiming apparatus comprises a heat exchanger connected to a compressor and a condenser of the refrigeration circuit for receiving refrigerant vapor from the compressor and discharging refrigerant to the condenser, wherein refrigerant vapors pass in heat transfer relation with the heat transfer fluid to heat the fluid and cool the vapors. The heat exchanger is further connected to a source of the heat transfer fluid for receiving fluid therefrom; and still further connected to the heat storage facility for discharging the heat transfer fluid thereto. The heat reclaiming apparatus further comprises a valve for regulating the flow of the heat transfer fluid to the heat exchanger; and a control for controlling the valve to decrease the quantity of heat transfer fluid flowing to the heat exchanger when the temperature of the heat transfer fluid discharged therefrom falls below a predetermined value.

8 Claims, 1 Drawing Figure

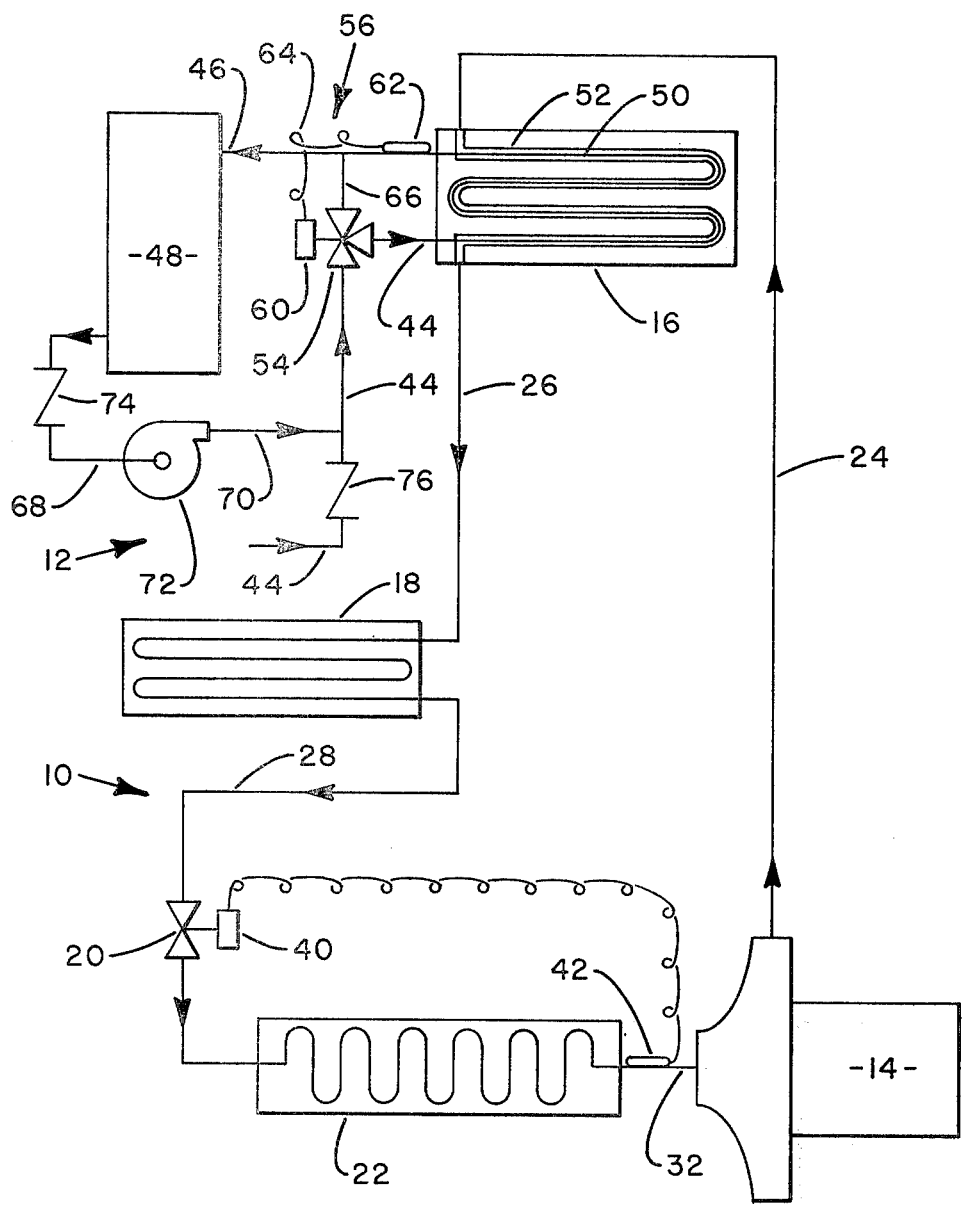

HEAT RECLAIMING METHOD AND APPARATUS

DESCRIPTION

Background of the Invention

The present invention relates generally to a heat reclaiming method and apparatus, and more particularly to a method and apparatus for reclaiming the normally wasted heat rejected by the refrigerant of a refrigeration circuit.

Vapor compression refrigeration systems generally comprise a compressor, a condenser, an expansion device, and an evaporator connected by appropriate refrigerant lines to form a refrigeration circuit. Refrigerant vapor is compressed by the compressor and fed to the condenser where the refrigerant rejects heat to a cooling medium and condenses. The condensed refrigerant then flows through the expansion device, reducing the pressure and temperature of the refrigerant. From the expansion device, the refrigerant passes into the evaporator, absorbs heat from a medium which is thereby cooled, and vaporizes. Vaporous refrigerant is then drawn back into the compressor, completing the circuit.

Refrigeration circuits of the foregoing type are frequently employed to cool a fluid such as air which is circulated through various rooms or areas of a building to, in turn, cool these areas. Often, the refrigerant of such a circuit rejects a relatively large amount of heat at the condenser of the circuit. This rejected heat is commonly dissipated to the atmosphere, either directly or via a cooling fluid that circulates between the condenser and a cooling tower. Over a period of time, the rejected heat represents a substantial waste of energy, and recently much attention has been directed to reclaiming or recovering this heat.

One general approach to reclaiming this heat has been to position a heat reclaiming heat exchanger between the compressor and condenser of the refrigeration circuit wherein the hot, compressed refrigerant vapor discharged from the compressor flows through the added heat exchanger. Water is circulated through the heat reclaiming heat exchanger in heat transfer relation with the vapor passing therethrough and heat is transferred from the vapor to the water, heating the water and cooling the vapor. The heated water is conducted to a storage tank where the water may be stored for later use, and the cooled vapor is directed to the condenser of the refrigeration circuit where the vapor is further cooled and condensed.

Under certain circumstances, a portion of the refrigerant vapor passing through the heat reclaiming heat exchanger may condenses therein. Since the quantity of liquid refrigerant in the condenser and the portions of the refrigerant circuit downstream thereof is substantially independent of any condensation in the heat reclaiming heat exchanger; if refrigerant condensed in the heat reclaiming heat exchanger, then the total amount of liquid refrigerant in the refrigeration circuit increases. This results, of course, in a reduction in the amount of refrigerant vapor in the refrigeration circuit, with an attendant loss in cooling capacity.

Also, a mixture of liquid and vaporous refrigerant upstream of the condenser may interfere with the normal refrigerant flow through the condenser and the entire refrigeration circuit, reducing the efficiency of that circuit. For example, compressor flow capacities are generally equated to the expected flow resistance of the condensor, expansion device, and evaporator. A mixture of liquid and vaporous refrigerant, which typically has a higher flow resistance than vaporous refrigerant alone, in the tubing leading to the condenser increases the load on the compressor, increasing the amount of work the compressor must do in order that the refrigeration circuit obtain the same refrigeration effect.

In addition, the liquid condensed refrigerant may interfere with the flow of vapor to the condensor. In such a case, pressure increases upstream of the flow restriction, while downstream thereof the pressure in the condenser and evaporator is reduced with a further loss in cooling capacity. Moreover, since the compressor lubricant of many refrigeration circuits becomes entrained with the refrigerant vapor passing through the compressor and flows through the refrigeration circuit with the refrigerant, interfering with the flow of refrigerant through the circuit also interferes with the flow of lubricant therethrough. Under severe conditions, the compressor may be deprived of a sufficient supply of lubricant, causing excessive wear of the compressor.

SUMMARY OF THE INVENTION

In light of the above, an object of the present invention is to improve methods and apparatus for reclaiming heat from a vapor compression refrigeration circuit.

Another object of this invention is to provide an inexpensive, reliable, and efficient heat recovery method and apparatus well adapted for use on a retrofit basis or as part of an original design system.

A further object of the present invention is to employ a heat reclaiming heat exchanger upstream of the condenser of a conventional refrigeration circuit without producing excessive condensation of the refrigerant.

Still another object of this invention is to vary the amount of heat transfer fluid circulated through a heat reclaiming heat exchanger in response to the temperature of the heat transfer fluid discharged therefrom.

These and other objectives are attained with heat reclaiming apparatus for use with a vapor compression refrigeration circuit, a heat transfer fluid, and a heat storage facility. The heat reclaiming apparatus comprises heat exchanger means connected to a compressor and a condenser of the refrigeration circuit for receiving refrigerant vapor from the compressor and discharging refrigerant to the condenser, wherein refrigerant vapors pass in heat transfer relation with the heat transfer fluid to heat the fluid and cool the vapors; means connecting the heat exchanger to a source of the heat transfer fluid for receiving fluid therefrom; and means connecting the heat exchanger to the heat storage facility for discharging the heat transfer fluid thereto. The heat reclaiming apparatus further comprises valve means for regulating the flow of the heat transfer fluid to the heat exchanger means; and control means for controlling the valve means to decrease the quantity of heat transfer fluid flowing to the heat exchanger means when the temperature of the heat transfer fluid discharged therefrom falls below a predetermined value.

BRIEF DESCRIPTION OF THE DRAWING

The sole FIGURE is a schematic representation of a vapor compression refrigeration circuit and a heat reclaiming apparatus for use therewith and incorporating teachings of the present invention.

DESCRIPTION OF THE PREFERRED EMBODIMENT

The sole FIGURE is a schematic illustration showing a vapor compression refrigeration circuit, generally referenced as 10, and heat reclaiming apparatus, generally referenced as 12, for use with circuit 10 and incorporating teachings of the present invention. Refrigeration circuit 10 includes compressor 14, heat reclaiming heat exchanger 16, condenser 18, expansion means 20 and evaporator 22 connected by refrigeration lines 24, 26, 28, 30 and 32 to form a refrigeration circuit. Compressor 14 discharges hot, compressed refrigerant vapor into line 24, which leads to heat exchanger 16, discussed in greater detail below. The vapor cools as it passes through heat exchanger 16 and therefrom the vapor passes through line 26 and to condenser 18. As refrigerant passes through condensor 18, the refrigerant rejects heat to an external heat exchange medium such as air moving thereover, and the refrigerant is thereby condensed. From condenser 18, liquid refrigerant proceeds through line 28 and through expansion means 20. Preferably, for reasons discussed below, expansion means 20 is variable, but it will be apparent to one skilled in the art that a fixed type of expansion device, for example a capillary tube, may also be used with the present invention. Expansion means 20 reduces the temperature and pressure of refrigerant passing therethrough. The expanded refrigerant proceeds through line 30 and through evaporator 22 where the refrigerant absorbs heat from an external heat exchange medium such as air moving thereover. The refrigerant vaporizes as it passes through evaporator 22, and vaporous refrigerant is discharged from the evaporator into line 32 leading back to compressor 14.

The air moving over evaporator 22 may be used for a number of different purposes, for example to cool the rooms of a building (not shown), and then returned to the evaporator. The load on refrigeration circuit 10, represented by the air passing thereover, varies, and preferably evaporator 22 cools that air to a substantially constant final temperature. Any suitable means may be employed to control the operation of evaporator 22 in such a way to meet this objective. In the system depicted in the drawing, the control includes variable expansion means 20 and positioning means 40, which may be of any suitable type such as an electric, pneumatic, or hydraulic positioner. Positioning means 40 controls the amount of refrigerant passing through expansion means 20 in response to variations in the load on circuit 10 as represented by changes in the temperature of refrigerant vapor leaving evaporator 22. This temperature is sensed by sensing means 42 which also may be of any suitable type, for example a thermo-sensitive bulb.

Referring now to heat reclaiming apparatus 12, the apparatus comprises heat reclaiming heat exchanger 16 which, as discussed above, is connected to compressor 14 via line 24 and condenser 18 via line 26 for receiving refrigerant vapor from the compressor and discharging refrigerant to the condenser. Preferably, condenser 18 is capable of satisfying the entire condensation needs of circuit 10, allowing circuit 10 to operate independently of heat reclaiming apparatus 11. Heat reclaiming heat exchanger 16 is further connected, via line 44, to a source (not shown) of a heat transfer fluid for receiving fluid therefrom; and heat exchanger 16 is still further connected, via line 46, to heat storage facility 48 for discharging fluid thereto. Many suitable types of heat transfer fluids, sources, and storage facilities therefor are well known to those skilled in the art and may be employed in the practice of the present invention. For example, the heat transfer fluid may be water, the source thereof may be a water tank or a municipal water supply, and the heat storage facility may be a hot water tank.

Preferably, heat exchanger 16 is a tube-in-tube type of heat exchanger including tubes 50 disposed within tubes 52. It should be specifically noted, though, that many types of heat exchangers are well known in the art and may be used in lieu of tube-in-tube heat exchanger 16. Referring to heat exchanger 16 in greater detail, tubes 50 thereof are connected to refrigerant lines 24 and 26 and tubes 52 are connected to fluid lines 44 and 46 wherein heat transfer fluid from the source thereof flows through tubes 52 and therefrom passes to heat storage facility 48. Vaporous refrigerant entering heat exchanger 16 via line 24 passes through tubes 50, flowing over tubes 52 in heat transfer relation with the heat transfer fluid passing therethrough. Heat is transferred from the vapor to the fluid within tubes 52, heating the fluid and cooling the vapor. The heated fluid then passes through line 46 to storage facility 48 where the fluid may be stored for later use. In this manner, heat reclaiming apparatus 12 recovers heat from refrigeration circuit 10 which would otherwise simply be dissipated to the atmosphere via condenser 18.

Refrigerant vapor cooled in heat reclaiming heat exchanger 16 passes to condenser 18 via line 26. On occasion, at least a portion of the refrigerant vapor condenses in heat exchanger 16; and, depending on operating conditions of refrigeration circuit 10 and the temperature and quantity of heat transfer fluid passing through the heat reclaiming heat exchanger, the amount of refrigerant condensing in heat exchanger 16 may noticeably interfere with operation of refrigeration circuit 10. More specifically, as discussed above, the quantity of liquid refrigerant in condenser 18 and the portions of refrigeration circuit 10 downstream thereof is substantially independent of condensation in heat exchanger 16. Thus, if refrigerant condenses in heat exchanger 16, the total amount of liquid refrigerant in circuit 10 increases, reducing the amount of vaporous refrigerant in the circuit, and this reduces the cooling capacity of the refrigeration circuit. Further, a mixture of liquid and vaporous refrigerant upstream of condenser 18 may interfere with the desired flow of refrigerant through the condenser and through circuit 10 as a whole. For example, compressor flow capacities are commonly matched to the expected flow resistance of the condenser, expansion means, and evaporator; and the presence of a vapor-liquid mixture, which typically has a higher resistance to flow than vaporous refrigerant alone, in the tubing leading to the condenser, increases the load on the compressor. In order to produce the same refrigeration effect, compressor 14 must perform more work, increasing the cost of refrigeration circuit 10. Also, compressor 14 may be forced to operate at an inefficient level, further increasing the cost of producing the desired refrigeration effect. In addition, liquid, condensed refrigerant upstream of condenser 18 may interfere with or restrict the flow of vaporous refrigerant to condenser 18. In such a case, refrigerant may collect upstream of the flow restriction, while downstream of the flow restriction, in the condenser and evaporator, the amount of refrigerant is reduced with a concomitant loss in cooling capacity.

To eliminate the above-discussed problems resulting from over condensation of refrigerant in heat exchanger 16, the heat reclaiming apparatus of the present invention includes valve means 54 and control means 56. Valve means 54, preferably including a three-way modulating valve located in line 44, regulates the flow of the heat transfer fluid to heat exchanger 16, and more particularly heat exchange tubes 52 therein. Control means 56, preferably including positioning means 60 and temperature sensing means 62, controls valve means 54 in response to the temperature of the heat transfer fluid discharged from heat exchanger 16. Valve means 54 and control means 56 cooperate to reduce the quantity of heat transfer fluid flowing through line 44 to heat exchanger 16 when the temperature of the heat transfer fluid discharged therefrom falls below a predetermined value.

More specifically, sensing means 62 is secured to line 46 in good heat transfer relation therewith for sensing the temperature of the heat transfer fluid passing therethrough and producing a signal indicative of that temperature. As will be appreciated, sensing means 62 may be of any suitable type, for example a thermo-sensitive bulb arranged to produce a pneumatic signal responsive to the temperature of the fluid passing through line 46.

The signal produced by sensing means 62 is applied to positioning means 60 via line 64 therebetween. Positioning means 60, which also may be of any appropriate type such as an electric, hydraulic, or pneumatic positioner, controls modulating valve 54 in response to the magnitude of the signal applied to the positioning means. In this manner, sensing means 62, positioning means 60, and valve means 54 cooperate to gradually, directly vary the flow of the heat transfer fluid passing through heat exchanger 16 in response to changes in the temperature of the heat transfer fluid discharged therefrom.

As the quantity of heat transfer fluid flowing through heat exchanger 16 begins to decrease, the velocity of the fluid flow therethrough also decreases. The heat transfer fluid spends a greater amount of time in heat exchanger 16, and this causes the temperature of the fluid to rise a greater amount than before the fluid flow was restricted. With this greater temperature rise, less heat is transferred to the heat transfer fluid from the refrigerant vapor because the temperature difference therebetween decreases. This reduces the rate of condensation in heat exchanger 16, eliminating or at least minimizing many of the above-discussed problems. Eventually an equilibrium condition is reached wherein the amount of heat transferred to the heat transfer fluid is sufficient to maintain the equilibrium temperature thereof but is insufficient to further raise the temperature of the heat transfer fluid. Under preferred equilibrium conditions, the rate of condensation in heat exchanger 16 is minimal, and ideally is zero.

As mentioned above, heat recovered from refrigeration circuit 10 by reclaiming apparatus 12 is transferred to heat storage facility 48 via line 46. Heat storage facility 48 may be utilized to satisfy demands of, for example, a commercial or residential building. Preferably, a supplementary heat source (not shown) such as an oil or gas fired burner is disposed within facility 48 to supplement the heat transferred thereto via reclaiming apparatus 12, ensuring that the heat storage facility satisfies the demands placed thereon regardless of fluctuations in the amount of heat reclaimed from circuit 10 by apparatus 12.

Further, preferably heat reclaiming apparatus 12 includes bypass means, including bypass line 66, for conducting heat transfer fluid from the source thereof to heat storage facility 48 to bypass heat reclaiming heat exchanger 16, and valve means 54 diverts heat transfer fluid from line 44 to the bypass means as valve means 54 regulates the flow of the heat transfer fluid through line 44. In this manner, the heat transfer fluid can be employed to, for example, cool or limit the temperature of the fluid entering or stored in storage facility 48. The bypass means also permits valve 54 to regulate fluid flow through line 44 and to heat exchanger 16 without increasing the pressure of the fluid in line 44 upstream of valve 54.

Moreover, preferably recirculating means, including lines 68 and 70 and pump 72, is provided for selectively conducting heat transfer fluid from heat storage facility 48 and back to heat exchanger 16 for selectively reheating the heat transfer fluid and further raising the temperature thereof when this is desirable. More specifically, to recirculate heat transfer fluid, pump 72 is operated to draw fluid from storage facility 48 via line 68 and discharge the fluid into line 44 via line 70. The fluid then flows through line 44, valve 54, and heat exchanger 16. The heat transfer fluid returns to storage facility 48 via line 46, completing a closed loop fluid circuit. Check valve 74 is located in line 68 to prevent fluid flow therethrough when pump 72 is inoperative, and check valve 76 is positioned in line 44 to prevent fluid from escaping from the above-described closed loop fluid circuit via line 44.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

I claim:

1. A method of operating apparatus for reclaiming heat from a vapor compression refrigeration circuit, the heat reclaiming apparatus having a heat exchanger, an inlet line connecting the heat exchanger with a source of a heat transfer fluid, an outlet line connecting the heat exchanger with a heat storage facility, and a bypass line connecting the inlet and outlet lines, the method comprising the steps of:
   conducting refrigerant vapor from the refrigeration circuit through the heat exchanger;
   conducting heat transfer fluid through the heat exchanger in heat transfer relation with refrigerant vapor to heat the fluid and cool the vapor;
   conducting heated heat transfer fluid from the heat exchanger, through the outlet line, past the bypass line, and to the heat storage facility;
   sensing the temperature of the heat transfer fluid passing through a portion of the outlet line between the heat exchanger and the bypass line; and
   controlling the heat transfer fluid to decrease the amount of the fluid passing through the heat exchanger when the sensed temperature falls below a predetermined level.

2. The heat operating method as defined by claim 1 wherein the controlling step includes the step of directly modulating the amount of heat transfer fluid passing in heat transfer relation with refrigerant vapor in response to changes in the sensed temperature of the heat transfer fluid.

3. The operating method as defined by claim 2 wherein the modulating step includes the step of diverting heat transfer fluid away from the heat exchanger and through the bypass line when the sensed temperature reaches the predetermined level.

4. The operating method as defined by claim 3 further including the step of recirculating heat transfer fluid into heat transfer relation with refrigerant vapor to reheat the heat transfer fluid.

5. Heat reclaiming apparatus for use with a vapor compression refrigeration circuit, a heat transfer fluid, and a heat storage facility, the heat reclaiming apparatus comprising:
 a heat exchanger means connected to a compressor and a condenser of the refrigeration circuit for receiving refrigerant vapor from the compressor and discharging refrigerant to the condenser, wherein refrigerant vapors pass in heat transfer relation with the heat transfer fluid to heat the fluid and cool the vapors;
 an inlet line for conducting the heat transfer fluid from the source thereof to the heat exchanger means;
 an outlet line for conducting the heat transfer fluid from the heat exchanger means to the heat storage facility;
 a bypass line for conducting the heat transfer fluid from the inlet line to the outlet line to bypass the heat exchanger means;
 sensing means connected to a portion of the outlet line between the heat exchanger means and the bypass line for sensing the temperature of the fluid passing through this portion of the outlet line; and
 fluid flow control means for regulating the flow of the heat transfer fluid to the heat exchanger means and responsive to the sensing means to decrease the quantity of heat transfer fluid flowing to the heat exchanger means when the sensed temperature falls below a predetermined value.

6. The heat reclaiming apparatus as defined by claim 5 wherein the fluid flow control means includes;
 a modulating valve located in the inlet line; and
 positioning means to position the modulating valve to directly vary the quantity of heat transfer fluid flowing to the heat exchanger means in response to changes in the sensed temperature of the heat transfer fluid.

7. The heat reclaiming apparatus as defined by claim 6 wherein
 the modulating valve diverts heat transfer fluid through the bypass line when the sensed temperature of the heat transfer fluid reaches the predetermined valve.

8. The heat reclaiming apparatus as defined by claim 3 further including recirculating means for conducting heat transfer fluid from the heat storage facility and to the heat exchanger means to reheat the heat transfer fluid.

* * * * *